United States Patent
Lin

(10) Patent No.: US 12,222,022 B1
(45) Date of Patent: Feb. 11, 2025

(54) TRANSMISSION DEVICE WITH BRAKING STRUCTURE

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/387,740

(22) Filed: Nov. 7, 2023

(30) Foreign Application Priority Data

Sep. 20, 2023 (TW) .................................. 112210174

(51) Int. Cl.
*F16H 1/16* (2006.01)
*F16H 25/24* (2006.01)
*F16H 48/29* (2012.01)
*F16H 57/02* (2012.01)

(52) U.S. Cl.
CPC ............... *F16H 1/16* (2013.01); *F16H 48/29* (2013.01); *F16H 57/02* (2013.01); *F16H 2025/2463* (2013.01); *F16H 2057/02034* (2013.01); *F16H 2057/02073* (2013.01)

(58) Field of Classification Search
CPC .... F16H 2025/2463; F16H 48/29; F16H 1/16; F16H 57/02; F16H 2057/02034; F16H 2057/02073
See application file for complete search history.

(56) References Cited

U.S. PATENT DOCUMENTS 4,652,781 A * 3/1987 Andrei-Alexandru ....................... B60J 7/0573
310/83
11,788,611 B1 * 10/2023 Lin ....................... F16H 57/039
74/425

* cited by examiner

*Primary Examiner* — Terence Boes
(74) *Attorney, Agent, or Firm* — Chun-Ming Shih; HDLS IPR SERVICES

(57) ABSTRACT

A transmission device (1) includes a gearbox (10), a motor set (20) and a braking set (30). The gearbox (10) includes a housing (11) and a transmission set (12) arranged in the housing (11), and the housing (11) includes a socket (111). The motor set (20) includes a motor body (21) and a rotating shaft (22) disposed protrusively from the front side of the motor body (21). The rotating shaft (22) is inserted in the socket (111) and connected to the transmission set (12). The braking set (30) is installed on the rotating shaft (22) and positioned in the socket (111), and the braking set (30) applies braking force on the rotating shaft (22). Therefore, the effect of saving space at the end of the motor is achieved.

9 Claims, 7 Drawing Sheets

TRANSMISSION DEVICE WITH BRAKING STRUCTURE

BACKGROUND OF THE DISCLOSURE

Technical Field

The technical field relates to a braking structure, and more particularly relates to a transmission device with a braking structure.

Description of Related Art

Electric lifting columns have been widely used in industrial, medical, and educational environments, especially in applications such as work tables and hospital beds that require quietness and smooth height adjustment. Additionally, the electric lifting column uses a motor to drive the lead screw, worm, worm gear and other mechanisms for transmission, and the controlling the lifting speed is achieved through the disposition of the braking structure.

Moreover, most motor braking modules of the related art are installed at the end of the motor. However, this installation method of the braking module needs to reserve installation space and avoid interference with other mechanical parts. As a result, that results in restrictions in parts arrangement and increases the overall length of the motor set. In this regard, how to break the motor and achieve the effect of saving the space at the rear end of the motor is the research motivation of the inventor.

In view of the above drawbacks, the inventor proposes this disclosure based on his expert knowledge and elaborate researches in order to solve the problems of related art.

SUMMARY OF THE DISCLOSURE

One object of this disclosure is to provide a transmission device with a braking structure to achieve the purpose of shortening the overall length and volume of the motor while maintaining the effect of braking.

This disclosure is a transmission device including a gearbox, a motor set, and a braking set. The gearbox includes a housing and a transmission set arranged in the housing, and the housing includes a socket. The motor set includes a motor body and a rotating shaft disposed protrusively from a front side of the motor body. The rotating shaft is inserted in the socket and connected to the transmission set. The braking set is installed on the rotating shaft and positioned in the socket, and the braking set applies baking force on the rotating shaft.

In one embodiment of this disclosure, the gearbox further includes a restricting frame and a restricting block located inside the socket. The braking set includes a braking block, a braking ring, and a braking spring. The braking block passes through the rotating shaft and is positioned on the restricting frame. The braking ring is arranged on the braking block and sheathes the rotating shaft. The braking spring encircles the braking ring and is held in place by the restricting block to be prevented from disengaging from the rotating shaft.

In one embodiment of this disclosure, the braking block includes a blocking block, a spacing groove is defined on the braking ring, and the blocking block is accommodated in the spacing groove.

In one embodiment of this disclosure, the housing includes an annular plate located on an outer side of the socket. The motor body includes a protrusion surface located on a bottom side of the rotating shaft, and the protrusion surface is attached to the annular plate and seals the socket.

In one embodiment of this disclosure, the motor set further includes a bearing. The bearing is disposed on the protrusion surface and abuts against the braking block.

In one embodiment of this disclosure, the braking ring includes a plurality of arc-shaped pieces, and the arc-shaped pieces are attached to each other and arranged annularly on an outer periphery of the rotating shaft.

In one embodiment of this disclosure, a plurality of anti-slip patterns are disposed on an outer periphery of the braking ring to increase the friction with the braking spring.

In one embodiment of this disclosure, a plurality of grooves are disposed on an inner wall surface of the braking ring for storing lubricating oil. The grooves are extended from the top surface of the arc-shaped piece to the bottom side of the arc-shaped piece.

In one embodiment of this disclosure, the braking ring includes a flange on the side facing the motor body thereof.

In comparison with the related art, the transmission device with a braking structure of this disclosure includes a braking block disposed between the motor body and the braking ring to prevent the braking ring from interfering with the bearing at the front end of the motor, thereby damage to the bearing being prevented. As a result, the braking ring is isolated from the bearing at the front of the motor and the braking ring is positioned. Furthermore, the housing of the gearbox may block the braking spring and prevent the braking spring from disengaging from the rotating shaft. Moreover, the braking set of this disclosure is arranged in the housing of the gearbox, and that may save space at the rear end of the motor and reduce the volume.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
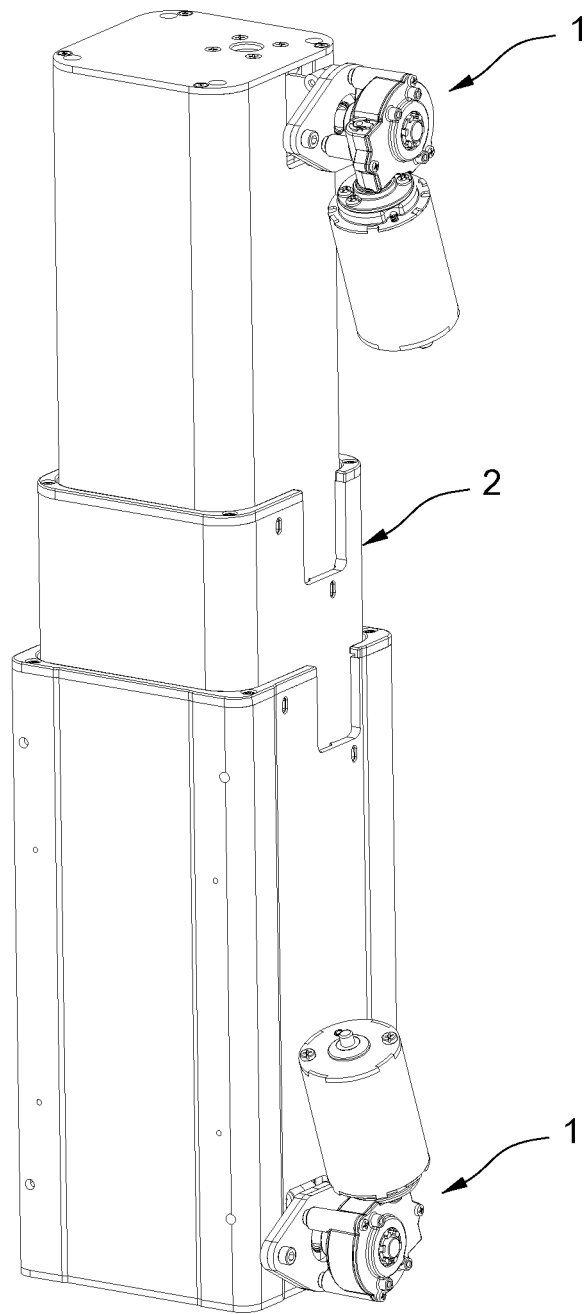
FIG. 1 is an application schematic view of the transmission device with a braking structure in this disclosure.

Please refer to FIG. 1, which is an application schematic view of the transmission device with a braking structure in this disclosure. This disclosure is a transmission device 1 with a braking structure, which is applied to an electric lifting column 2 for controlling the vertical movement of the electric lifting column 2 to adjust the height of a work table or a hospital bed.

It should be noted that in this embodiment, the transmission device 1 with the braking structure is respectively provided on the front and rear sides of the electric lifting column 2 to accelerate the lifting speed of the electric lifting column 2. In some embodiments, the electric lifting column 2 may only be provided with one transmission device 1 with the braking structure.

Figure 2:
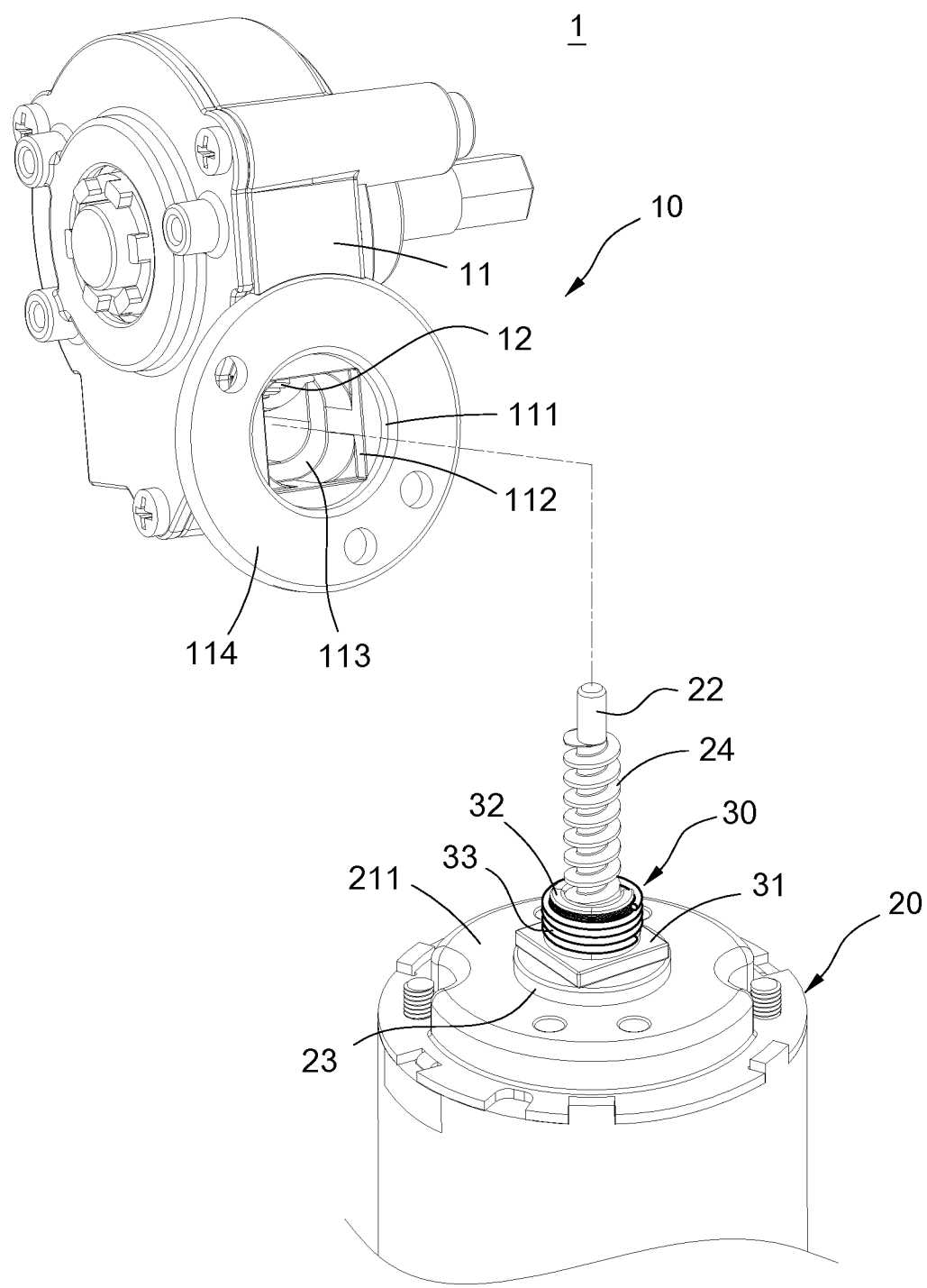
FIG. 2 is a perspective exploded schematic view of the transmission device with a braking structure in this disclosure.

Please further refer to FIG. 2, which is a perspective exploded schematic view of the transmission device with the braking structure in this disclosure. The transmission device 1 with the braking structure in this disclosure includes a gearbox 10, a motor set 20 and a braking set 30. The gearbox 10 includes a housing 11 and a transmission set 12 arranged in the housing 11. The housing 11 includes a socket 111, a restricting frame 112 and a restricting block 113 located inside the socket 111.

The motor set 20 includes a motor body 21 and a rotating shaft 22 disposed protrusively from the front side of the motor body 21. The rotating shaft 22 is inserted in the socket 111 and connected to the transmission set 12. It should be noted that the rotor, stator, coil winding, etc., disposed inside the motor body 21 are not described in detail here.

The braking set 30 is installed on the rotating shaft 22 and positioned in the socket 111, and the braking set 30 applies braking force on the rotating shaft 22. Specifically, the braking set 30 includes a braking block 31, a braking ring 32 and a braking spring 33. Furthermore, the housing 11 includes an annular plate 114 located on the outer side of the socket 111. The motor body 21 includes a protrusion surface 211 located on the bottom side of the rotating shaft 22. The protrusion surface 211 is attached to the annular plate 114 and seals the socket 111.

Moreover, in one embodiment of this disclosure, the motor set 20 further includes a bearing 23 and a worm 24. The bearing 23 is disposed on the protrusion surface 211 and abuts against the braking block 31. The worm 24 is arranged on the rotating shaft 22 and connected to the transmission set 12.

Figure 3:
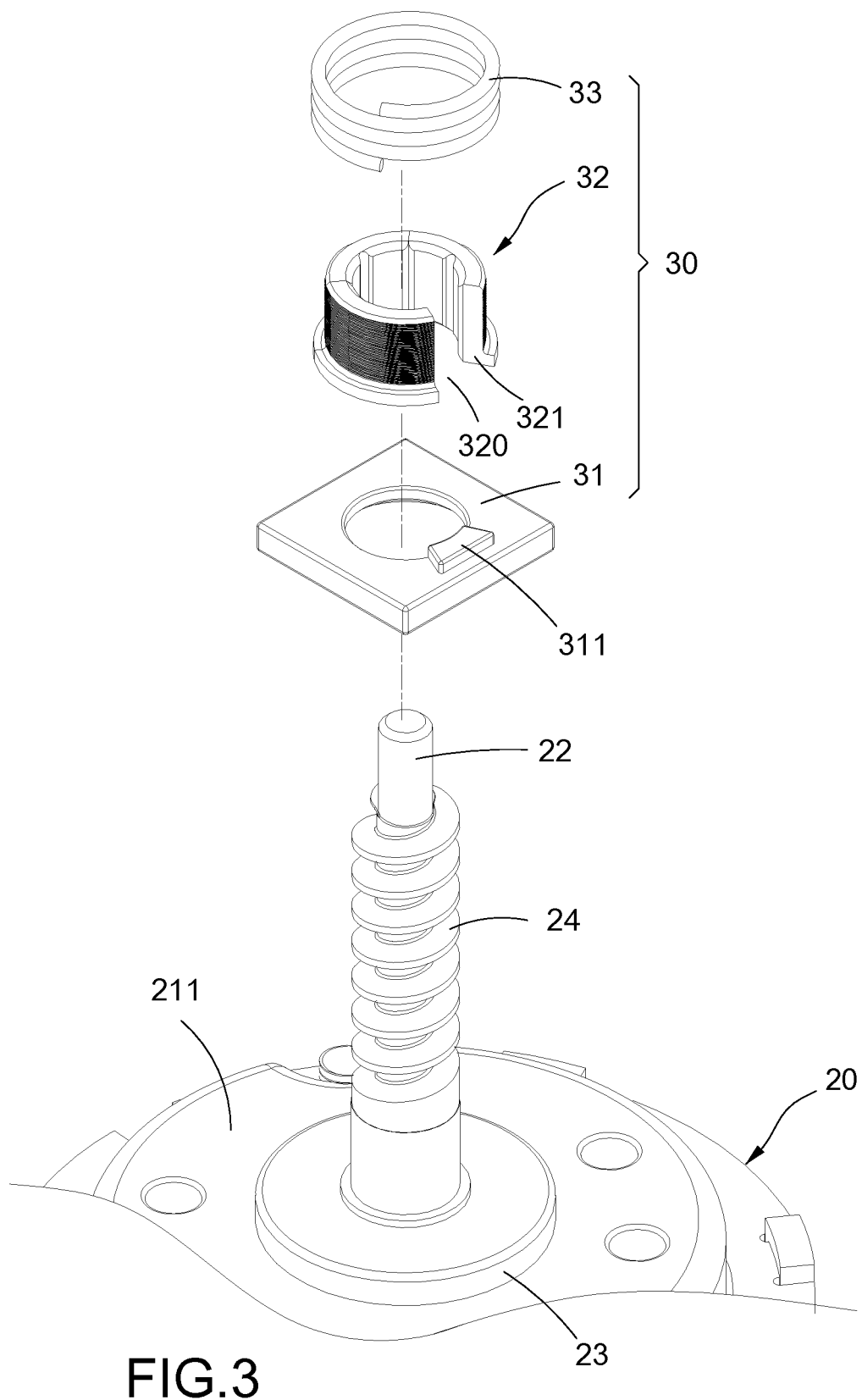
FIG. 3 is a perspective exploded schematic view of the braking set in this disclosure.
Figure 4:
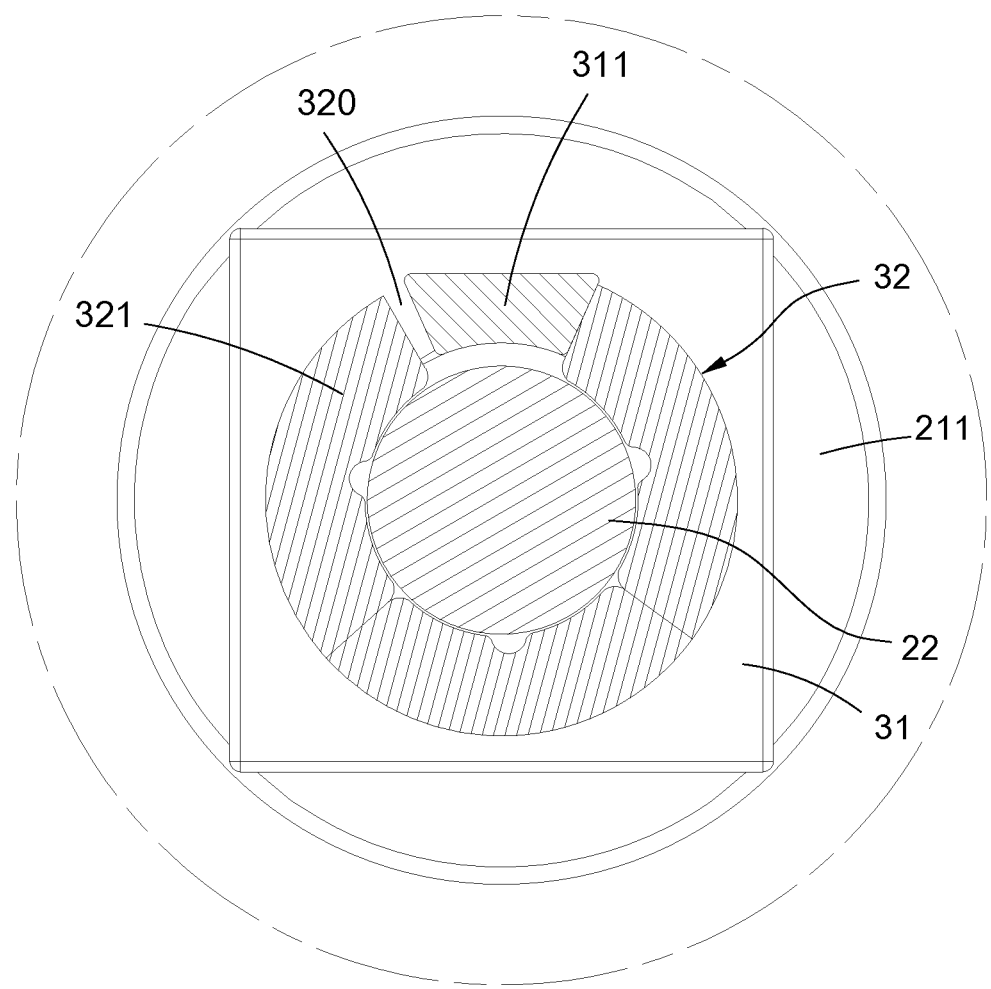
FIG. 4 is a cross sectional view of the braking set in this disclosure.
Figure 5:
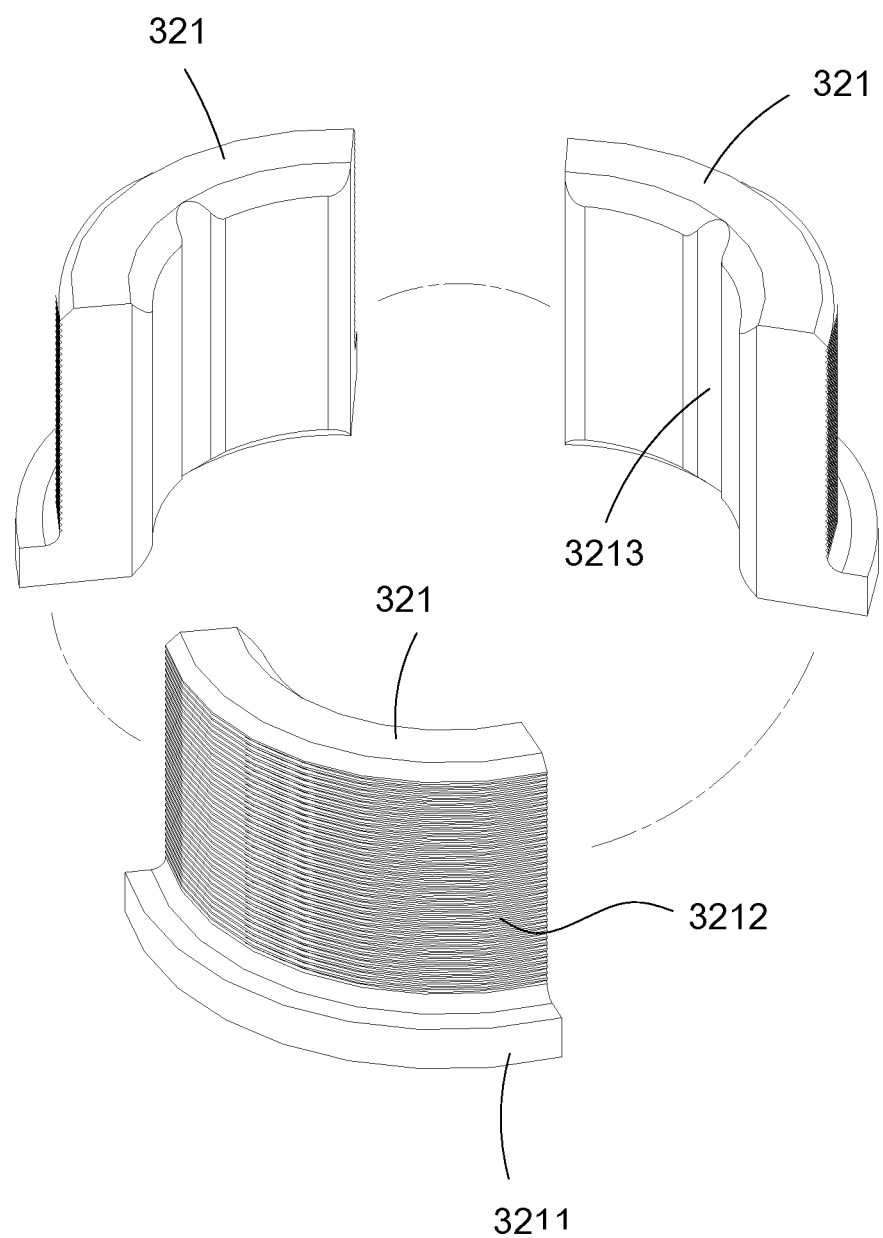
FIG. 5 is a perspective exploded schematic view of the braking ring in this disclosure.

Please further refer to FIG. 3 to FIG. 5, which are a perspective exploded schematic view of the braking set in this disclosure, a cross sectional view of the braking set in this disclosure and a perspective exploded schematic view of the braking ring in this disclosure. The braking block 31 of the braking set 30 of this disclosure includes a blocking block 311. Additionally, the braking block 31 passes through the rotating shaft 22 and is positioned on the restricting frame 112 of the housing 11. Furthermore, a spacing groove 320 is defined on the braking ring 32. The braking ring 32 is arranged on the braking block 31 and sheathes the rotating shaft 22. As a result, the blocking block 311 is accommodated in the spacing groove 320 to prevent the braking ring 32 from rotating along with the rotating shaft 22. Moreover, the braking spring 33 encircles the braking ring 32 and is held in place by the restricting block 113 to be prevented from disengaging from the rotating shaft 22.

In more detailed, the braking ring 32 includes a plurality of arc-shaped pieces 321. The arc-shaped pieces 321 are arranged in juxtaposition and annularly on the outer periphery of the rotating shaft 22. Additionally, the braking ring 32 includes a flange 3211 on the side facing the motor body 21 thereof. A plurality of anti-slip patterns 3212 are disposed on the outer periphery of the braking ring 32 to increase the friction with the braking spring 33. The anti-slip patterns 3212 are disposed to avoid slipping and prevent the braking spring 33 from sliding or disengaging.

Furthermore, a plurality of grooves 3213 are disposed on the inner wall surface of the braking ring 32 for storing lubricating oil. The grooves 3213 are extended from the top surface of the arc-shaped piece 321 to the bottom side of the arc-shaped piece 321. The lubricating oil is coated between the contact surfaces of the rotating shaft 22 and the braking ring 32 to provide lubrication and cooling effects when frictional motion is occurred therebetween.

Moreover, the braking spring 33 is a compression spring corresponding to the shape of the braking ring 32. The braking spring 33 may be a right-handed circular coil spring, thereby causing the braking spring 33 and the braking ring 32 to shrink radially when the rotating shaft 22 rotates reversely. On the contrary, the braking spring 33 and the braking ring 32 may expand radially when the rotating shaft 22 rotates forwardly.

Figure 6:
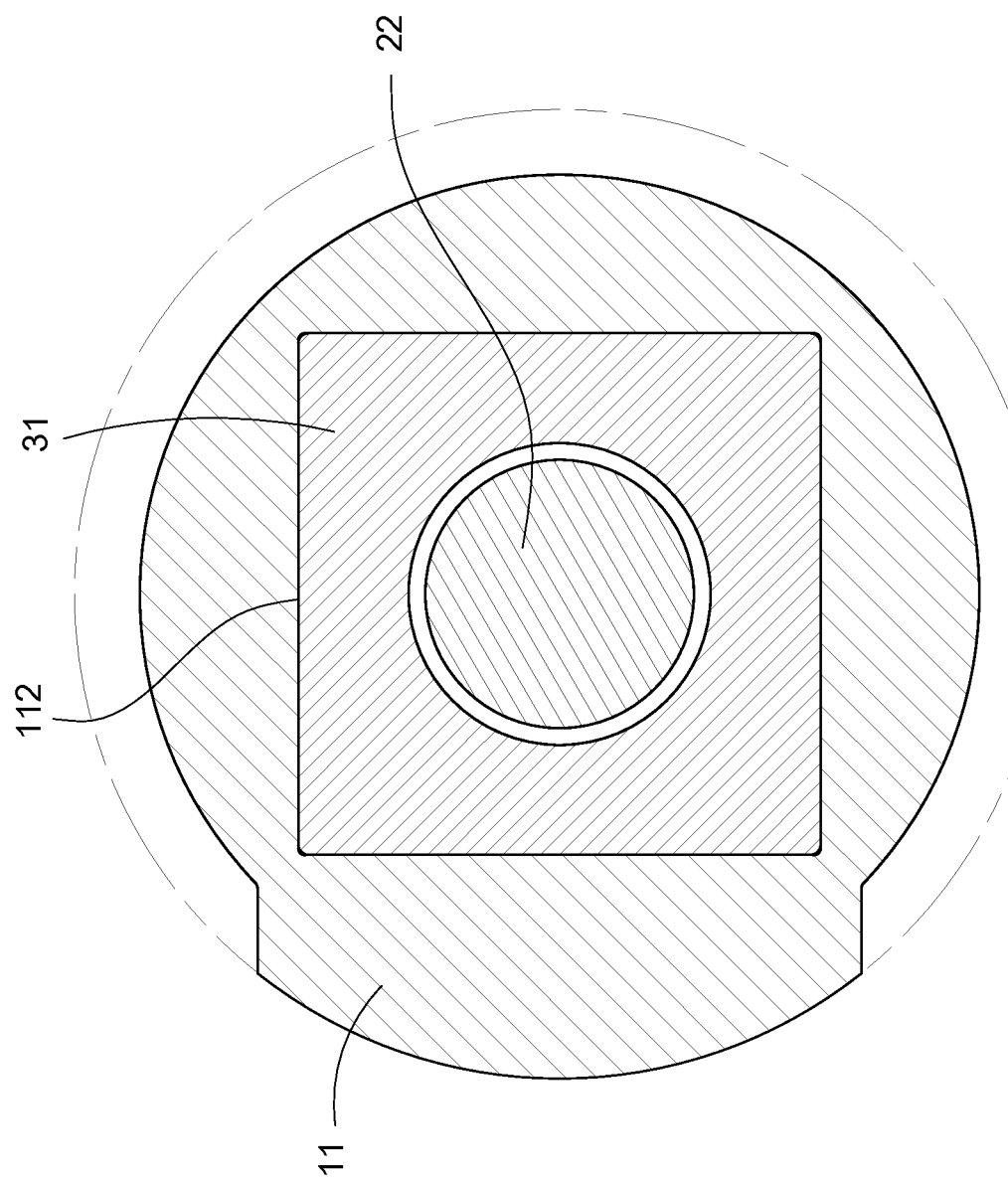
FIG. 6 is a cross sectional view of the blocking block combined in the housing in this disclosure.
Figure 7:
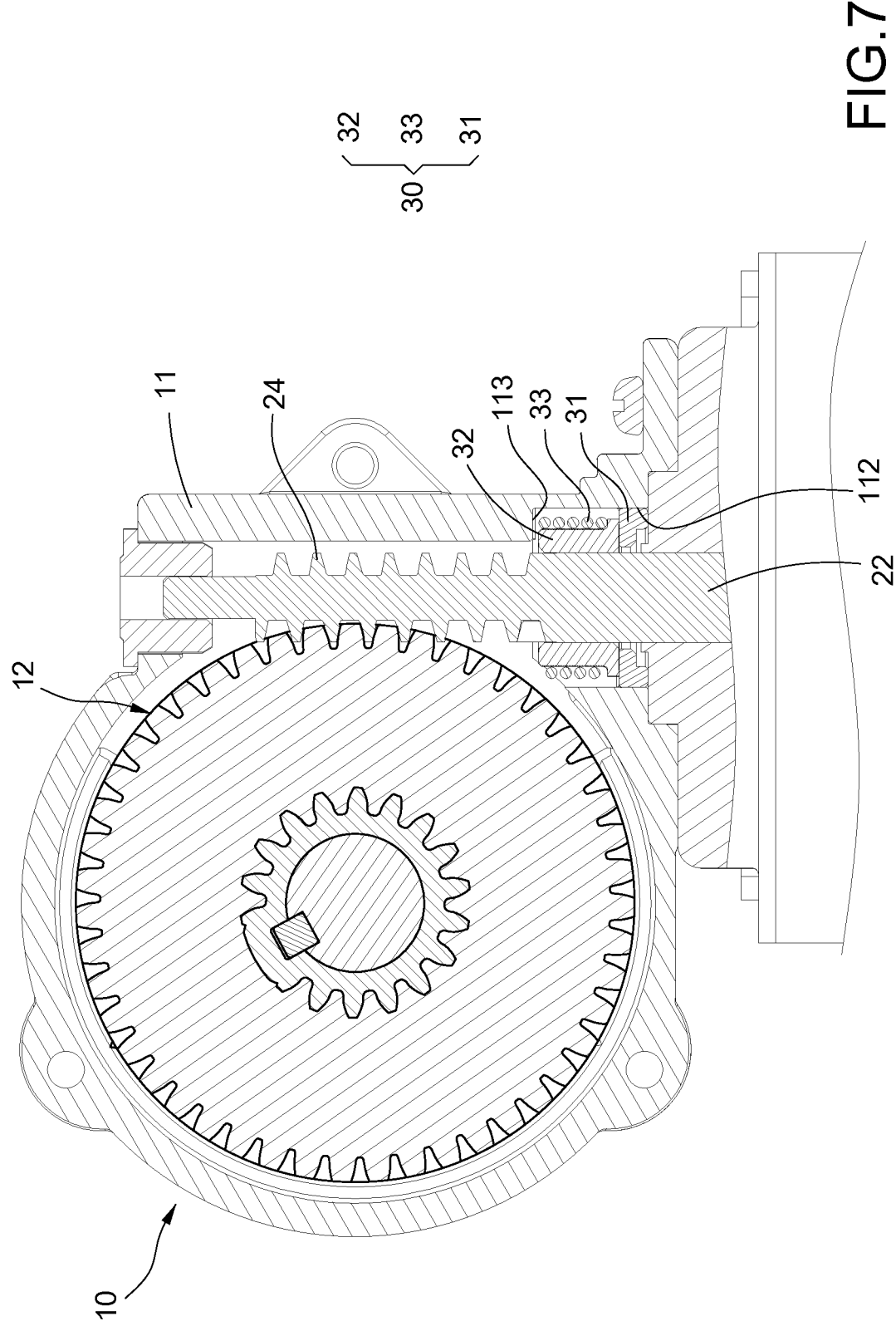
FIG. 7 is a cross sectional view of the transmission device with a braking structure in this disclosure.

Please further refer to FIG. 6 and FIG. 7, which are a cross sectional view of the blocking block combined in the housing in this disclosure and a cross sectional view of the transmission device with a braking structure in this disclosure. The braking set 30 of the transmission device 1 of this disclosure is disposed on the front side of the motor set 20. Additionally, the braking block 31 of the braking set 30 is positioned on the restricting frame 112. It should be noted that the arrangement of the braking set 30 to be disposed on the front side of the motor set 20 may achieve the effect of shortening the overall length and volume of the motor set 20 while maintaining the intended purpose of braking.

When the transmission device 1 of this disclosure is in use, the rotating shaft 22 located on the front side of the motor set 20 is provided with a worm 24 and inserts in the socket 111 of the gearbox 10 to be connected to the transmission set 12. Accordingly, the rotating shaft 22 is driven by the components in the motor body 21 to rotate.

It is worth of noticing that when the rotating shaft 22 rotates reversely, the braking spring 33 and the braking ring 32 shrink radially. Then, the inner wall surface of each arc-shaped piece 321 is in frictional contact with the surface of the shaft 22 to perform a braking effect and reduce the rotation speed.

On the contrary, when the rotating direction of the rotating shaft 22 is opposite to the rotating direction of the braking spring 33, the rotating shaft 22 drives each arc-shaped piece 321 and the braking spring 33 to expand radially. Then, each arc-shaped piece 321 does not contact the surface of the rotating shaft 22. As a result, the rotating shaft 22 may rotate in the braking ring 32, thereby maintaining the transmission speed of the rotating shaft 22.

While this disclosure has been described by means of specific embodiments, numerous modifications and variations could be made thereto by those skilled in the art without departing from the scope and spirit of this disclosure set forth in the claims.

What is claimed is:
1. A transmission device (1), comprising:
   a gearbox (10), comprising a housing (11) and a transmission set (12) arranged in the housing (11), and the housing (11) comprising a socket (111);
   a motor set (20), comprising a motor body (21) and a rotating shaft (22) disposed protrusively from a front side of the motor body (21), the rotating shaft (22) inserted in the socket (111) and connected to the transmission set (12); and a braking set (30), installed on the rotating shaft (22) and positioned in the socket (111), and configured to generate a braking force to the rotating shaft (22);

wherein the gearbox (10) further comprises a restricting frame (112) and a restricting block (113) located inside the socket (111), the braking set (30) comprises a braking block (31), a braking ring (32) and a braking spring (33), the rotating shaft (22) passes through the braking block (31) which is positioned in the restricting frame (112), the braking ring (32) is arranged on the braking block (31) and adapted to sheathe the rotating shaft (22), and the braking spring (33) is disposed around the braking ring (32) and abutted against by the restricting block (113).

2. The transmission device (1) according to claim 1, wherein the braking block (31) comprises a blocking block (311), a spacing groove (320) is defined on the braking ring (32), and the blocking block (311) is accommodated in the spacing groove (320).

3. The transmission device (1) according to claim 1, wherein the housing (11) comprises an annular plate (114) located on an outer side of the socket (111), the motor body (21) comprises a protrusion surface (211) located on a bottom side of the rotating shaft (22), and the protrusion surface (211) is attached to the annular plate (114) and configured to seal the socket (111).

4. The transmission device (1) according to claim 3, wherein the motor set (20) further comprises a bearing (23), and the bearing (23) is disposed on the protrusion surface (211) and abuts against the braking block (31).

5. The transmission device (1) according to claim 1, wherein the braking ring (32) comprises a plurality of arc-shaped pieces (321), and the arc-shaped pieces (321) are attached to each other and arranged annularly on an outer periphery of the rotating shaft (22).

6. The transmission device (1) according to claim 5, wherein a plurality of anti-slip patterns (3212) is disposed on an outer periphery of the braking ring (32).

7. The transmission device (1) according to claim 5, wherein a plurality of grooves (3213) is disposed on an inner wall surface of the braking ring (32) to store a lubricating oil, and the grooves (3213) are extended from a top surface of the arc-shaped piece (321) to a bottom side of the arc-shaped piece (321).

8. The transmission device (1) according to claim 1, wherein a plurality of anti-slip patterns (3212) is disposed on an outer periphery of the braking ring (32).

9. The transmission device (1) according to claim 1, wherein a plurality of grooves (3213) is disposed on an inner wall surface of the braking ring (32) to store a lubricating oil, and the grooves (3213) are extended from a top surface of the arc-shaped piece (321) to a bottom side of the arc-shaped piece (321).

* * * * *